United States Patent [19]
Kenjo et al.

[11] Patent Number: 4,486,506
[45] Date of Patent: Dec. 4, 1984

[54] SOLID INSULATOR AND ELECTRIC EQUIPMENT COIL USING THE SAME

[75] Inventors: Susumu Kenjo, Fujisawa; Minoru Shimahara, Yokkaichi; Toshio Gokyu, Mie, all of Japan

[73] Assignee: Tokyo Shibaura Denki Kabushiki Kaisha, Kawasaki, Japan

[21] Appl. No.: 434,370

[22] Filed: Oct. 14, 1982

[30] Foreign Application Priority Data

Oct. 16, 1981 [JP] Japan ................. 56-165031
Jun. 30, 1982 [JP] Japan ................. 57-112929
Jun. 30, 1982 [JP] Japan ................. 57-112930
Jun. 30, 1982 [JP] Japan ................. 57-112939
Jun. 30, 1982 [JP] Japan ................. 57-112940

[51] Int. Cl.³ .................. H02H 3/48; H02K 3/36
[52] U.S. Cl. .................. 428/475.2; 310/45; 310/208; 310/215; 427/104; 427/116; 428/480
[58] Field of Search .............. 310/215, 45, 208; 427/104, 116; 428/475.2, 480

[56] References Cited

U.S. PATENT DOCUMENTS

| 3,686,069 | 8/1972 | Winkler | 428/475.2 |
| 3,735,169 | 5/1973 | Balke et al. | 310/215 |
| 4,016,321 | 4/1977 | McIntyre, Jr. | 428/475.2 |
| 4,160,926 | 7/1979 | Cape et al. | 310/215 |
| 4,373,002 | 2/1983 | Petersen-Høj | 428/480 |
| 4,375,494 | 3/1983 | Stokes | 428/480 |

Primary Examiner—John E. Kittle
Attorney, Agent, or Firm—Oblon, Fisher, Spivak, McClelland & Maier

[57] ABSTRACT

A solid insulator for an electric equipment coil is proposed which comprises a base film of a polyester, and a protective film of a resin selected from the group consisting of polypropylene, polyester, fluoropolymer, and aramid resin, which is formed on at least one major surface of said base film. There is also proposed an electric equipment coil comprising a winding which is resistive to hydrolysis and chemicals, an insulating film surrounding said winding, and a water-soluble insulating varnish filled and cured under heating between turns of said winding, wherein said insulating film comprises above said solid insulator.

14 Claims, 7 Drawing Figures

F I G. 1
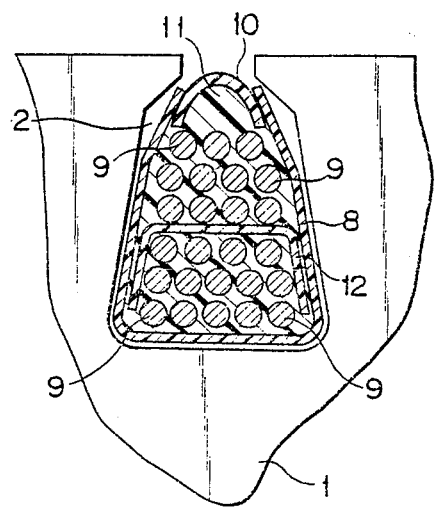
F I G. 2
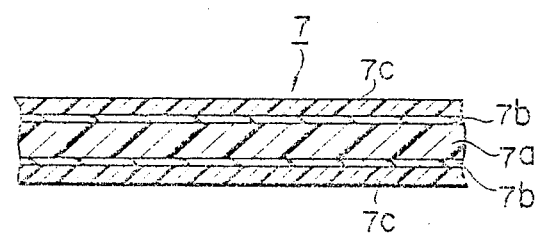

SOLID INSULATOR AND ELECTRIC EQUIPMENT COIL USING THE SAME

BACKGROUND OF THE INVENTION

The present invention relates to a solid insulator which may be conveniently used in combination with a water-soluble insulating varnish, and to an electric equipment coil using the same. The present invention further relates to a method for insulation treatment of an electric equipment coil.

As a solid insulator which may be used in combination with a water-soluble insulating varnish containing as a solvent water or dimethyl ethanolamine, a polyimide film is known having excellent resistances to hydrolysis, chemicals and solvents, or a combination thereof with another material. However, such an insulator is expensive and may not be used in practice.

In view of this problem, it has been recently proposed to use as such an insulator a heat-resistant aramid paper having a thickness of 0.075 to 0.6 mm or a combination thereof with another material. An insulator of this type is inexpensive. However, if such an insulator is actually used as a slot insulator of an iron rotor core, and heat-resistant aramid papers are adhered to both surfaces of an inexpensive polyester film, the overall thickness of the insulator becomes great. This results in a decrease in space factor within the slots, and in complex assembly operation due to poor slip characteristics of the heat-resistant aramid paper.

If a polyester film is used alone as the insulator, the above problem may be solved. However, the following new problems are encountered. When the polyester film is used alone, the solvent component such as water or dimethyl ethanolamine contained in the varnish causes a chemical reaction such as hydrolysis or crystallization depending upon the combination of drying temperature and time (e.g., 150° C. or higher for 4 hours or longer) after varnish treatment. When such a chemical reaction occurs, the tensile strength retention is decreased to about 50%, which results in a decrease in flexibility, and in degradation of the characteristics of the polyester film.

If a polyester wire which is generally used for a winding is combined with a water-soluble insulating varnish, the polyester enamel film is chemically modified under the heat of drying, resulting in degradation of dielectric breakdown strength.

SUMMARY OF THE INVENTION

The present invention has been made in consideration of this and has for its object to provide a solid insulator which is not subject to degradation of its characteristics by chemical reactions such as hydrolysis or crystallization which may occur when the insulator is used in combination with a water-soluble insulating varnish.

It is another object of the present invention to provide a solid insulator which is capable of exhibiting excellent characteristics in combination with a water-soluble insulating varnish, is inexpensive, is thin, and is suitable as a ground insulator or an interphase insulator for an electric equipment winding, and to provide an electric equipment winding which is treated for insulation and which comprises such a solid insulator, a synthetic resin enamel wire with excellent resistances to hydrolysis, chemicals and solvents, and a water-soluble insulating varnish.

It is still another object of the present invention to provide a method for insulation treatment of an electric equipment coil, which is capable of suppressing degradation of the characteristics of a solid insulator due to reaction with a water-soluble insulating varnish, and which results in good productivity.

According to an aspect of the present invention, there is provided a solid insulator comprising: a base film of a polyester; and a protective film of a resin selected from the group consisting of polypropylene, polyester, fluoropolymer such as polytetrafluoroethylene, and aramid resin, which is formed on at least one major surface of said base film.

According to another aspect of the present invention, there is also provided an electric equipment coil comprising a winding, an insulating film surrounding said winding, and a water-soluble insulating varnish filled and cured under heating between turns of said winding, wherein said winding comprises a synthetic resin enamel wire with excellent resistances to hydrolysis, chemicals and solvents; and said insulating film comprises a base film of a polyester, and a protective film of a resin selected from the group consisting of polypropylene, polyester, fluoropolymer such as polytetrafluoroethylene, and aramid resin, which is formed at least on one major surface of said base film.

According to still another aspect of the present invention, there is also provided a method for insulation treatment of an electric equipment coil, comprising the steps of surrounding a winding of a synthetic resin enamel wire having excellent resistances to hydrolysis, chemicals and solvents with an insulating film of a polyester, impregnating turns of said winding with a water-soluble insulating varnish, and heating to cure said insulating varnish, wherein the heating step is performed at 140° to 150° C. for 2.5 to 5.0 hours.

The polyester to be used herein is an unsaturated polyester resin.

According to the present invention, the base film of a polyester for the solid insulator preferably has a thickness of 0.075 to 0.350 mm considering mechanical characteristics such as tensile strength or shear strength; electrical characteristics such as dielectric breakdown voltage; nerve during assembly; space factor in installation and the like. The thickness of the base film may of course be selected freely depending an application.

The thickness of the protective film formed on at least one major surface of the base film is suitably selected in accordance with the application of the insulator and the characteristics of the resin used. Depending upon the type of resin of the protective layer used, it may be directly adhered or coated onto the base film or may be adhered thereto with an adhesive.

When the thickness of the polypropylene film is less than 0.01 mm, the protecting function of the base film comprising the polyester film against a chemical reaction with a water-soluble insulating varnish is significantly degraded. On the other hand, if the thickness of the polypropylene film is more than 0.06 mm, the composite insulator of the polypropylene film with the polyester film as a base film becomes considerably thick. When such a composite insulator is used for a slot insulator of a rotor core, the space factor within the slot (the ratio of the cross-sectional area of the winding to that of the slot) is significantly degraded. For these reasons, the thicknesses of the films must be selected within the ranges as described above.

The polypropylene film may be welded to the polyester base film instead of adhered thereto.

If a polyester film is used as a protective film, an adhesive with flexibility such as a synthetic resin adhesive is preferably used. The protective film and the base film are adhered through a layer of the adhesive having a thickness of preferably about several microns. The thickness of the polyester protective layer is preferably kept to be greater than (e.g., several to about 20 microns at 130° to 150° C. for 7 to 25 hours) the depth of cleavage which is caused by chemical reactions with a solvent contained in the water-soluble insulating varnish such as water or dimethyl ethanolamine. The thickness of the polyester protective layer is selected to be within the range of, for example, 0.025 to 0.075 mm. The protective layer of a polyester is modified by chemical reactions with the water-soluble insulating varnish and is thus degraded in characteristics. However, by the synergistic effect with the blocking and relaxing functions of the adhesive layer, the polyester base film is protected to prevent degradation of its characteristics. The range of thickness of the polyester protective layer may be selected in accordance with the application of the insulator.

If fluoropolymer such as polytetrafluoroethylene is used for the protective film, it preferably has a thickness of 0.010 to 0.100 mm and is preferably adhered with a silicone- or epoxy-type resin. If the thickness of the protective film of polytetrafluoroethylene is less than 0.010 mm, the protective effect against chemical reaction with a water-soluble insulating varnish and the suppressive effect on thermal degradation are significantly degraded. On the other hand, if the thickness of the protective film of polytetrafluoroethylene is more than 0.100 mm, it provides an insulator of too great a thickness when combined with the polyester base film.

If an aramid resin is used for the protective film, it is coated and baked on a polyester base film to a thickness of 0.005 to 0.075 mm. If the thickness of the aramid protective film is less than 0.005 mm, coatability and uniformity of the film are poor and pinholes tend to be formed. On the other hand, when the thickness of the aramid protective film is more than 0.075 mm, it provides an insulator of too great a thickness when combined with the polyester base film.

Examples of a winding of a synthetic resin enamel wire with excellent resistances to hydrolysis, chemicals and solvents to be used herein may include an ester imide wire, an amide-imide resin wire, and a theic-type polyester wire (tris-2-hydroethyl-isocyanate-type polyester wire).

The water-soluble insulating varnish may be a known water-soluble insulating varnish which contains, as a solvent, water, dimethyl ethanolamine or the like.

According to the present invention, a suitable resin layer is formed as a protective layer on a polyester base film. This protective layer or the protective layer with the adhesive serve to block adverse effects of chemical reactions such as hydrolysis or crystallization which may be caused when combined with the solvent component contained in the water-soluble insulating varnish such as water or dimethyl ethanolamine, depending upon various combinations of drying temperature and time. Thus, the protective layer effectively prevents degradation of the characteristics of the polyester base film. Furthermore, since the protective film is made of an inexpensive material, the resultant insulator may be manufactured at cheaper cost than conventional insulators.

With the structure of the insulator as described above, the three-layered structure does not result in too great an overall thickness, so that degradation of the space factor as a slot insulator of an iron rotor core may be prevented, and assembly may be facilitated.

According to the present invention, oxidation degradation which is the main cause of thermal degradation may be prevented. Therefore, the insulator of the present invention, in particular when fluoropolymer, aramid resin or aramid resin/polyester is employed as a protective layer, can provide class F insulation (i.e., can withstand a maximum temperature of 155° C.).

Since the protective layer of a resin as described above is formed on the surface of a polyester base film, a decrease in the initial tensile strength of the solid insulator is suppressed to at least less than 50%, or to less than 40% in most cases.

If a polyester amide-imide wire, an ester imide wire, or a theic-type polyester wire is used as the winding, the characteristics are not substantially degraded at a temperature of 160° C. or less, independently of the heating/drying time.

BRIEF DESCRIPTION OF THE DRAWINGS

FIG. 1 is a sectional view of an iron core slot of a rotor coil according to an embodiment of the present invention;

FIG. 2 is a sectional view of a solid insulator according to the embodiment of the present invention;

DETAILED DESCRIPTION OF THE PREFERRED EMBODIMENTS

Figure 3:
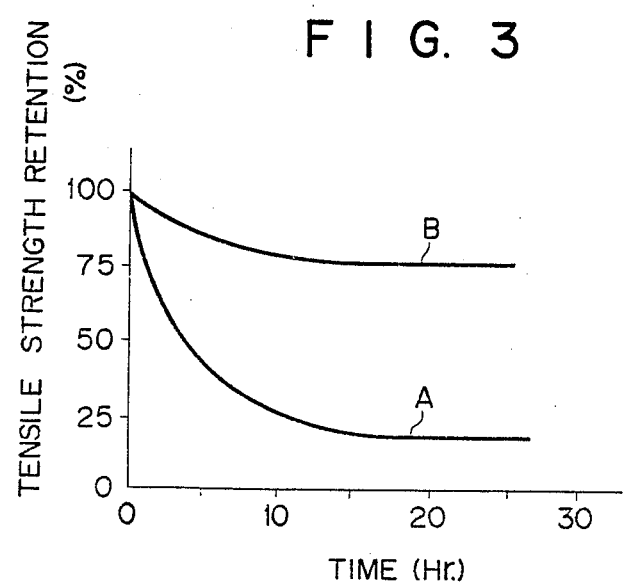
FIG. 3 is a graph showing tensile strength retention of the solid insulator of the present invention as a function of heating time in comparison with that of the conventional insulator.

FIG. 1 is a view wherein the present invention is applied to a rotor coil winding, and specifically shows a section of the iron core slot. As shown in FIG. 2, a solid insulator 7 of a multilayered structure comprises a base film 7a of a polyester film having a thickness of 0.075 to 0.350 mm, an adhesive layer 7b applied to both surfaces of the base film 7a (the adhesive layer 7b may be omitted), and a protective layer 7c having a predetermined thickness formed on each adhesive layer 7b. A slot insulator 8 obtained by forming the solid insulator 7 into a substantially U-shape is arranged inside a slot 2. A winding 9 is formed in the slot insulator 8, and comprises a synthetic resin enamel wire with excellent resistances to hydrolysis, chemicals and solvents, such as an ester imide wire, an amide-imide wire, or a theic-type polyester wire.

As shown in FIG. 1, an interphase insulator 12 obtained by bending the solid insulator 7 into a substantially U-shape may be inserted at a suitable position of the winding. An insulating wedge 10 obtained by forming the solid insulator 7 into a substantially circular shape is applied to securely hold the winding 9 and to insulate the winding from an iron core 1. Thereafter, the interior of the slot 2 is impregnated with a water-soluble insulating varnish and the winding end is impregnated with a thermosetting resin 11. The varnish and the resin 11 are dried at a drying temperature of 130° to 160° C. to cure them, thus preparing an integral coil.

The mechanical characteristics such as tensile strength or shear strength of the solid insulator 7 having a three-layered structure and the electric characteristics such as dielectric breakdown voltage thereof mostly depend upon those of a polyester film having a thickness of 0.075 to 0.350 mm as the base film 7a. The chemical reactions such as hydrolysis or crystallization of the base film 7a with the solvent content in a water-soluble insulating varnish such as water or dimethyl ethanolamine which depend on the combinations of drying time and temperature are prevented by the protective layer 7c (or the combination thereof with the adhesive 7b) formed on each surface of the base film 7a. Degradation of the characteristics of the base film 7a is thus prevented.

Figure 4:
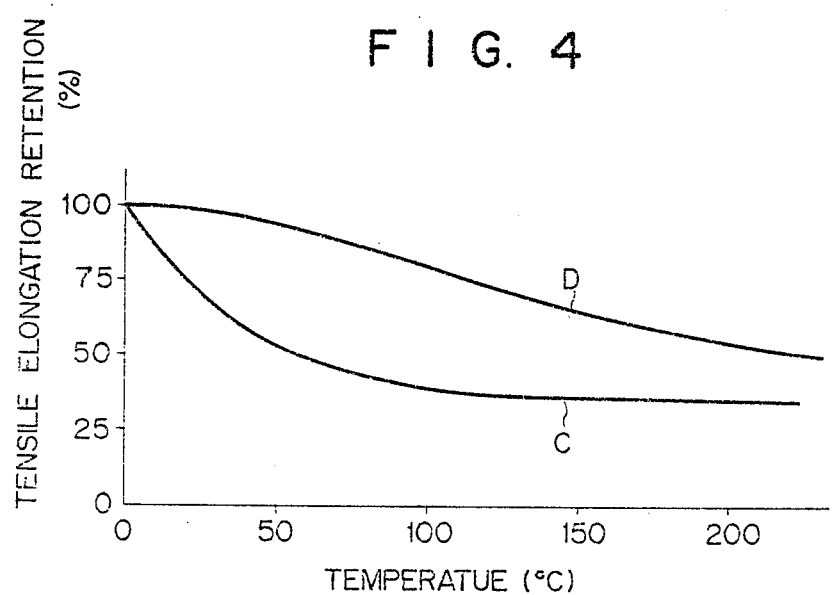
FIG. 4 is a graph showing the tensile elongation retained of the solid insulator of the present invention as a function of heating temperature in comparison with that of the conventional insulator.

If a polyester film alone is used as a class F insulator as in the conventional case, or is used in combination with a water-soluble insulating varnish, it causes a chemical reaction with water, dimethyl ethanolamine or the like contained in the varnish. According to the results of a test under working conditions (heating temperature: 160° C.), as seen from characteristic curve A in FIG. 3, the tensile strength retention is degraded to less than about 50%. When the film is bent, the surface layer causes cleavage of about 0.02 mm depth, which presents a problem in operation. In contrast to this, in characteristic curve B of the example of the present invention (using a polytetrafluoroethylene film), degradation of the characteristics of the base film 7a is significantly prevented. Heat resistance of the insulator is also improved since the thermal degradation of the base film 7a is prevented by blocking of the supply of oxygen by the protective layers 7c having heat resistance satisfying class F insulation. FIG. 4 shows the results obtained in a test of thermal degradation. In comparison to characteristic curve C of a polyester film alone, in characteristic curve D of the example of the present invention (with a polytetrafluoroethylene film), the decrease in the tensile elongation retention is significantly reduced to improve heat resistance by 15° to 25° C. Thus, the characteristics of the solid insulator 7 of the example of the present invention are satisfactory for class F insulation. When this solid insulator 7 is used in combination with a water-soluble insulating varnish, degradation of the characteristics by chemical reactions with the solvent content in the varnish which depend upon the combination of the drying time and temperature are reduced to the minimum, providing class F insulation. Especially when a polytetrafluoroethylene film is used as the protective layer 7c, the slip characteristics of the surface of the solid insulator 7 are improved to allow insertability equivalent to or better than that obtainable with a polyester film alone.

The solid insulator 7 need not be limited to a slot insulator or an insulating wedge but may be extended to a ground insulator, an interphase insulator or the like, used in windings which will be brought into contact with a water-soluble insulating varnish.

The present invention is not therefore limited to the particular embodiments described in the text and illustrated in the drawings, and various changes and modifications may be made within the spirit and scope of the present invention.

For example, depending upon the type or application of equipment to use an insulator, a water-soluble insulating varnish is applied to only one surface of the insulator. In such a case, similar effects as those obtained with an insulator of three-layered structure may be obtained with a two-layered structure wherein a protective layer is formed only on one surface of the base film.

In the embodiments described above, a description is made with reference to an insulator wherein a protective film is formed on each surface of a polyester base film to prevent degradation of the characteristics of the base film. However, even if a polyester base film alone is used in an electric equipment coil, it may be subjected to a method for insulation treatment according to the present invention considering the effects of the method which may act on the other parts of the winding. If such a method is adopted, the degradation of the characteristics of the polyester base film may be suppressed to a practically acceptable degree.

More specifically, according to this method, a polyester film is used as a solid insulator. As a winding, a synthetic resin enamel wire is used which has excellent resistances to hydrolysis, chemicals and solvents, such as an ester imide wire or a theic-type polyester wire (e.g., trade name: ISONEL-200; a product of Schenectady Chemical Inc. U.S.A.). The spaces between the polyester film and the winding are impregnated with a water-soluble insulating varnish and the structure is dried at a heating temperature of 140° to 150° C. for 2.5 to 5 hours. When this method is adopted, the degradation of the tensile strength retention of the polyester film is suppressed to less than 50%.

Figure 5:
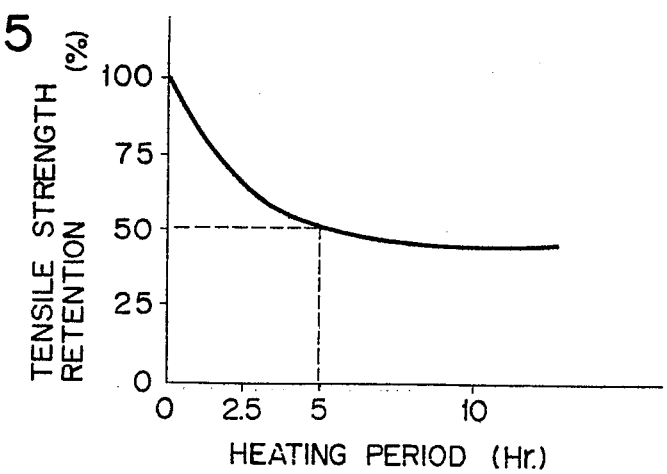
FIGS. 5 to 7 are graphs showing characteristics of an insulator as a function of treatment conditions for explaining the method for insulation treatment of an electric equipment coil according to the present invention.
Figure 6:
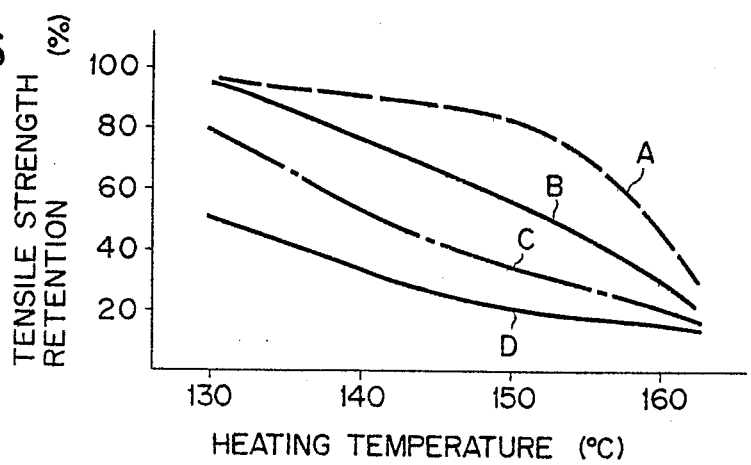
Figure 7:
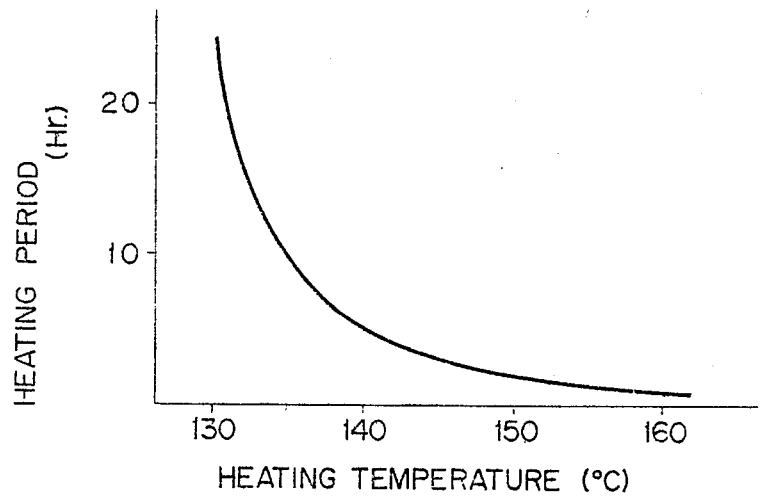

FIGS. 5 and 7 show criticality of the drying conditions. FIGS. 5 to 7 show tensile strength retention (%) or required drying time (Hr) as a function of drying time or temperature when a solid insulator is a polyester film of 0.35 mm thickness, a winding is an ester imide wire, and the spaces therebetween are impregnated with a water-soluble insulating varnish containing water, butyl "Cellosolve" or dimethyl ethanolamine. FIG. 5 shows the case wherein the heating temperature is kept at 150° C.; and in FIG. 6 curve A represents the case wherein the drying time is 2 hours, curve B represents the case wherein the drying time is 5 hours, curve C represents the case wherein the drying time is 7 hours, and curve D represents the case wherein the drying time is 24 hours.

As may seen from FIGS. 5 to 7, the tensile strength retention may be kept above 50%, thus providing satisfactory characteristics.

In the above description, the present invention is applied to a rotor coil winding as an example. However, the present invention may be similarly applied to transformer windings or control unit windings.

What we claim is:

1. A solid multi-layered insulator comprising: a base film of a polyester impregnated with a water-soluble insulating varnish; and a protective film of a resin selected from the group consisting of polypropylene, polyester, fluoropolymer, and aramid resin, which is formed on at least one major surface of said base film.

2. A three-layered insulator according to claim 1, wherein said impregnated polyester base film has a thickness of 0.075 to 0.350 mm.

3. An insulator according to claim 1, wherein said protective layer comprises a polypropylene film having a thickness of 0.01 to 0.06 mm.

4. An insulator according to claim 1, wherein said protective layer comprises a polyester film which has a thickness of 0.025 to 0.075 mm and which is adhered to said base film through an adhesive.

5. An insulator according to claim 1, wherein said protective layer comprises a fluoropolymer film having a thickness of 0.010 to 0.100 mm.

6. An insulator according to claim 1, wherein said protective layer comprises an aramid resin film having a thickness of 0.005 to 0.075 mm.

7. An electric equipment coil comprising a winding, a water-soluble varnish impregnated insulating film surrounding said winding, wherein said winding comprises a synthetic resin enamel wire with excellent resistances to hydrolysis, chemicals and solvents; and said insulating film comprises a base film of a polyester, and a protective film of a resin selected from the group consisting of polypropylene, polyester, fluoropolymer, and aramid resin, which is formed at least on one major surface of said base film.

8. A coil according to claim 7, wherein said winding comprises a member selected from the group consisting of a polyester amide wire, an ester imide wire, and a theic-type polyester wire.

9. A coil according to claim 7, wherein said base film has a thickness of 0.075 to 0.350 mm.

10. A coil according to claim 7, wherein said protective layer comprises a polypropylene film having a thickness of 0.01 to 0.06 mm.

11. A coil according to claim 7, wherein said protective film comprises a polyester film which has a thickness of 0.025 to 0.075 mm and which is adhered to said base film through an adhesive.

12. A coil according to claim 7, wherein said protective layer comprises a fluoropolymer film having a thickness of 0.010 to 0.100 mm.

13. A coil according to claim 7, wherein said protective layer comprises an aramid resin film having a thickness of 0.005 to 0.075 mm.

14. A method for insulation treatment of an electric equipment coil, comprising the steps of surrounding a winding of a synthetic resin enamel wire having excellent resistances to hydrolysis, chemicals and solvents with an insulating film of a polyester; impregnating turns of the polyester insulated winding with a water-soluble insulating varnish; and heating to cure said insulating varnish; wherein the heating step is performed at 140° to 150° C. for 2.5 to 5.0 hours.

* * * * *

UNITED STATES PATENT AND TRADEMARK OFFICE
CERTIFICATE OF CORRECTION

PATENT NO. : 4,486,506
DATED : December 4, 1984
INVENTOR(S) : Kenjo et al.

It is certified that error appears in the above-identified patent and that said Letters Patent is hereby corrected as shown below:

On the title page,
Foreign Application Priority Data should read:

-- [30] October 16, 1981    JAPAN    56-165031
       June 30, 1982    Japan    57-112929
       June 30, 1982    Japan    57-112930
       June 30, 1982    Japan    57-112939
       June 30, 1982    Japan    57-112940
       October 1, 1982    Japan    172765/82
       October 1, 1982    Japan    172771/82 --

-- [54] SOLID INSULATOR AND ELECTRIC EQUIPMENT COIL USING THE SAME & METHOD --.

Signed and Sealed this

Fourteenth Day of May 1985

[SEAL]

Attest:

DONALD J. QUIGG

Attesting Officer     Acting Commissioner of Patents and Trademarks